US011851008B2

United States Patent
Miller et al.

(10) Patent No.: US 11,851,008 B2
(45) Date of Patent: Dec. 26, 2023

(54) CAMERA BRACKET ASSEMBLY

(71) Applicant: ILLINOIS TOOL WORKS INC., Glenview, IL (US)

(72) Inventors: Karly R. Miller, Lemont, IL (US); Prasun K. Majumdar, Buffalo Grove, IL (US); Christopher T. Schaafsma, Wheaton, IL (US); Edward F. Bulgajewski, Genoa, IL (US)

(73) Assignee: Illinois Tool Works Inc., Glenview, IL (US)

(*) Notice: Subject to any disclaimer, the term of this patent is extended or adjusted under 35 U.S.C. 154(b) by 3 days.

(21) Appl. No.: 17/691,407

(22) Filed: Mar. 10, 2022

(65) Prior Publication Data
US 2022/0289120 A1    Sep. 15, 2022

Related U.S. Application Data

(60) Provisional application No. 63/161,106, filed on Mar. 15, 2021.

(51) Int. Cl.
*B60R 11/04* (2006.01)

(52) U.S. Cl.
CPC .................... *B60R 11/04* (2013.01)

(58) Field of Classification Search
CPC .. H04N 5/2253; H04N 5/2252; H04N 5/2254; B60R 11/04; B60R 1/20; B60R 1/22; B60R 1/23; B60R 1/24; B60R 1/25; B60R 1/26; B60R 2011/004; B60R 2011/0045
USPC ...... 248/200, 686, 674, 200.1, 220.1, 309.1, 248/310
See application file for complete search history.

(56) References Cited

U.S. PATENT DOCUMENTS

| | | | |
|---|---|---|---|
| 8,400,560 B1* | 3/2013 | Yang | H04N 23/51 348/148 |
| 9,871,971 B2* | 1/2018 | Wang | H05K 999/99 |
| 10,317,651 B2* | 6/2019 | Furutake | H04N 7/185 |
| 10,397,452 B2* | 8/2019 | Kazama | G01D 11/245 |
| 10,479,287 B2* | 11/2019 | Sliwa | B60S 1/56 |
| 10,527,910 B2* | 1/2020 | Kang | G03B 11/045 |
| 10,974,660 B2* | 4/2021 | Masui | H04N 23/57 |
| 11,097,691 B2* | 8/2021 | Kovach | B60R 11/04 |
| 11,124,130 B2* | 9/2021 | Winden | H04N 23/52 |

(Continued)

FOREIGN PATENT DOCUMENTS

| | | |
|---|---|---|
| DE | 102010023293 A1 | 12/2011 |
| DE | 102010052472 A1 | 5/2012 |

(Continued)

OTHER PUBLICATIONS

International Search Report and Written Opinion for PCT/US2022/019887, dated Jul. 4, 2022 (10 pages).

(Continued)

*Primary Examiner* — Christopher Garft
*Assistant Examiner* — Michael McDuffie
(74) *Attorney, Agent, or Firm* — Quarles & Brady LLP

(57) ABSTRACT

A bracket assembly for mounting a camera to a vehicle includes a bracket body and a glare shield that extends along the bracket body. A longitudinal axis is centrally disposed between a first sidewall and a second sidewall of the glare shield. At least one slit extends through the glare shield and spans between the first sidewall and the second sidewall.

18 Claims, 10 Drawing Sheets

(56) References Cited

U.S. PATENT DOCUMENTS

| | | | |
|---|---|---|---|
| 11,433,827 B2* | 9/2022 | Singh | B60R 11/04 |
| 2016/0023620 A1* | 1/2016 | Matori | G03B 11/045 |
| | | | 348/148 |
| 2017/0129404 A1* | 5/2017 | Oda | H04N 23/51 |
| 2018/0027151 A1 | 1/2018 | Kazama et al. | |
| 2018/0316833 A1 | 11/2018 | Okuda | |
| 2019/0013555 A1* | 1/2019 | Bulgajewski | H01M 10/617 |
| 2019/0033579 A1* | 1/2019 | Ohsumi | H04N 23/51 |
| 2019/0100158 A1* | 4/2019 | Wato | B60R 11/04 |
| 2019/0375344 A1* | 12/2019 | Kobayashi | H04N 23/52 |
| 2022/0214599 A1* | 7/2022 | Eytan | G03B 11/045 |

FOREIGN PATENT DOCUMENTS

| | | |
|---|---|---|
| DE | 102019200990 A1 | 7/2020 |
| DE | 102019213124 A1 | 3/2021 |
| EP | 3168084 A1 | 5/2017 |
| JP | 2019137289 A | 8/2019 |

OTHER PUBLICATIONS

International Search Report and Written Opinion for PCT/US2022/019890, dated Jul. 5, 2022 (10 pages).

\* cited by examiner

CAMERA BRACKET ASSEMBLY

RELATED APPLICATIONS

This application claims priority benefits from U.S. Provisional Application No. 63/161,106 filed Mar. 15, 2021, and entitled "Camera Bracket Assembly," which is hereby incorporated by reference in its entirety.

BACKGROUND

Camera bracket assemblies may be used in a variety of applications, including automobile manufacturing. For example, automated driver assistance systems, such as lane departure warning (LDW) systems, may comprise camera bracket assemblies on a front windshield or a rear windshield of a vehicle. Typical prior art camera bracket assemblies, such as bracket assembly 80 of FIG. 1, comprise a glare shield 84 with steps 88 that allow stray light passed through a windshield 92 to reflect into a camera 96. Such conventional camera bracket assemblies have many disadvantages.

SUMMARY

In one aspect, a bracket assembly for mounting a camera to a vehicle includes a bracket body and a glare shield that extends along the bracket body. A longitudinal axis is centrally disposed between a first sidewall and a second sidewall of the glare shield. At least one slit extends through the glare shield and spans between the first sidewall and the second sidewall.

In some embodiments, the glare shield includes at least one louver that at least partially defines the at least one slit. The at least one louver can include a plurality of louvers that are spaced apart from one another in a direction that is parallel with the longitudinal axis. In some embodiments, at least one slit spans continuously across the glare shield in a transverse direction that is normal to the longitudinal axis. In some embodiments, at least one slit includes a plurality of slits that are spaced apart from one another in a direction that is parallel with the longitudinal axis. Further, each slit of the plurality of slits has a length dimension in a direction parallel with the longitudinal axis and the length dimension varies among the plurality of slits. Additionally, each slit of the plurality of slits has a width dimension in a direction normal to the longitudinal axis and the width dimension varies among the plurality of slits.

In another aspect, a bracket assembly for mounting a camera to a vehicle includes a bracket body and a glare shield that extends along the bracket body. A longitudinal axis is centrally disposed between a first sidewall and a second sidewall of the glare shield. At least one louver spans between the first sidewall and the second sidewall.

In some embodiments, the at least one louver is disposed at an offset angle relative to a horizontal plane defined by the bracket body. In some embodiments, the at least one louver is disposed in a downward configuration. In other embodiments, the at least one louver is disposed in an upward configuration. The at least one louver includes a plurality of louvers that extend in an array from a first end to a second end of the glare shield. Further, the louvers are concavely curved between a leading end and a trailing end. Additionally or alternatively, the louvers are convexly curved between a leading end and a trailing end. In some embodiments, the louvers are spaced equidistant from one another. Further, the louvers have a leading end that is curved between the first sidewall and the second sidewall.

In yet another aspect, a bracket assembly for mounting a camera to a vehicle includes a bracket body and a glare shield that extends along the bracket body. A longitudinal axis is centrally disposed between a first sidewall and a second sidewall of the glare shield. At least one louver spans between the first sidewall and the second sidewall and defines at least one slit. In addition, the bracket assembly includes a heater strip.

In some embodiments, the heater strip is applied to the at least one louver of the glare shield. Further, the heater strip extends between the first sidewall and the second sidewall of the glare shield in a curvilinear path. The heater strip is configured to be operated to clear a viewing zone formed by the glare shield.

DETAILED DESCRIPTION

Figure 2:
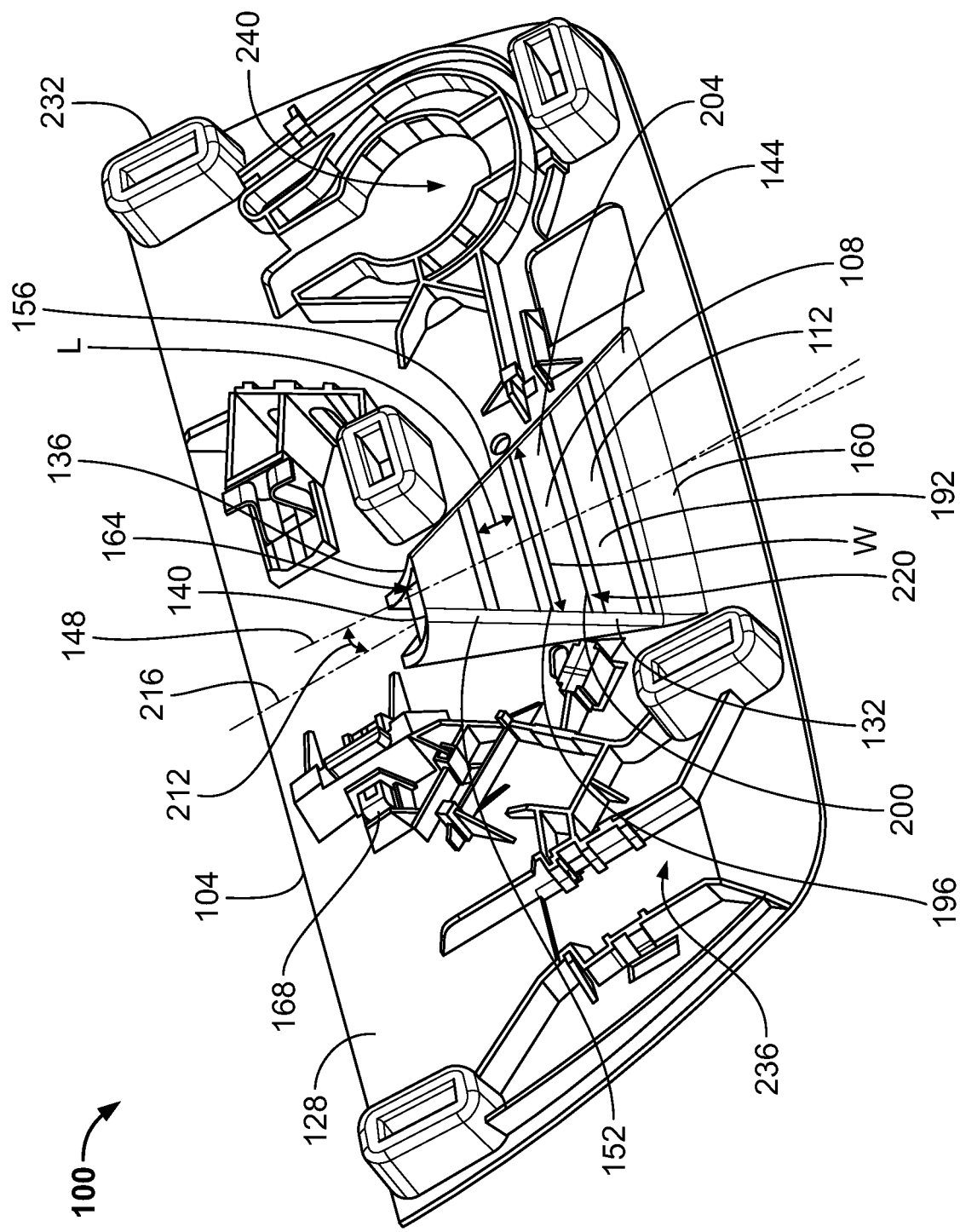
FIG. 2 is a front, top, and left side isometric view of a camera bracket assembly including a glare shield with louvers integrally formed in the glare shield, according to an embodiment of the present disclosure.
Figure 3:
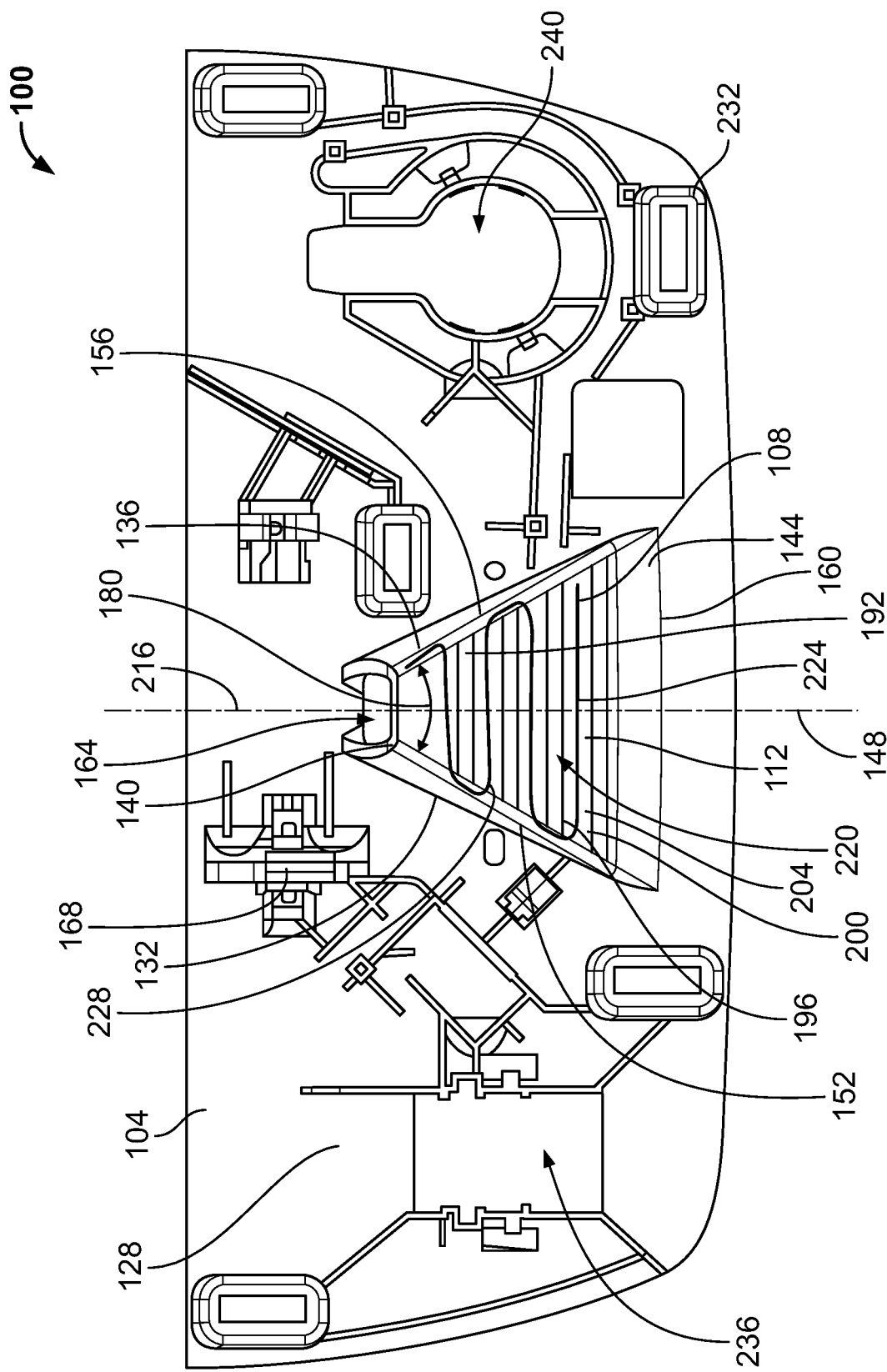
FIG. 3 is a top plan view of a camera bracket assembly including a glare shield with louvers integrally formed in the glare shield.
Figure 4:
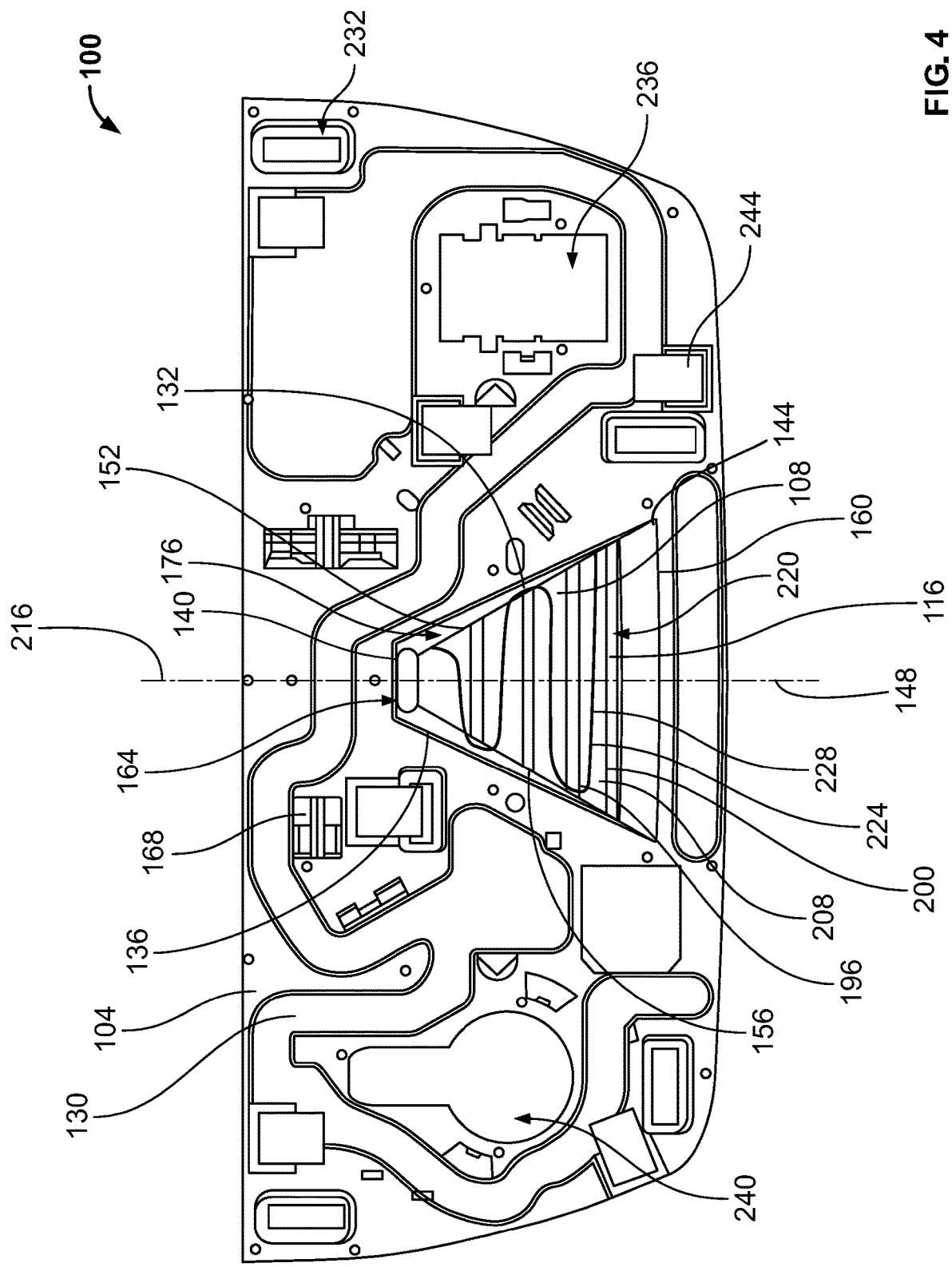
FIG. 4 is a back plan view of the camera bracket assembly of FIG. 3.
Figure 5:
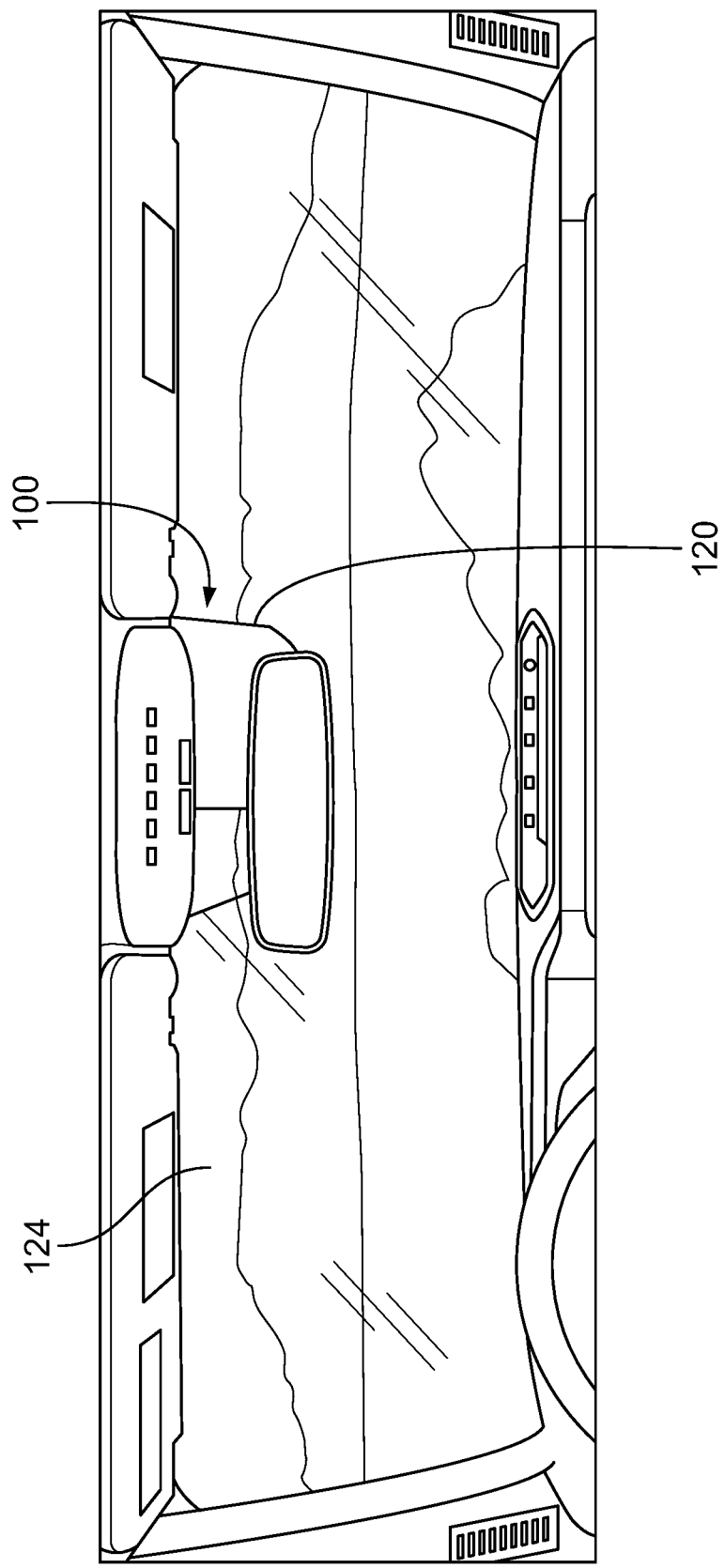
FIG. 5 illustrates the camera bracket assembly of FIG. 3 mated to a windshield of a vehicle.

FIGS. 2-5 depict a camera bracket assembly or bracket assembly 100. FIGS. 2-4 depict the bracket assembly 100 including a bracket body 104 and a glare shield 108. FIGS. 2 and 3 depict a first shield side 112 of the glare shield 108 on the bracket body 104. FIG. 4 depicts a second shield side 116 of the glare shield 108 on the bracket body 104. With reference to FIG. 5, the bracket assembly 100 further includes a beauty cover or housing 120, and the bracket assembly 100 is attached to a windshield 124 of a vehicle. Throughout the disclosure, the terms "about" and "approximately" mean plus or minus 5% of the number that each term precedes.

In the present disclosure, the camera may be a component of a lane departure warning (LDW) system, where the camera detects lane markings on a road while a vehicle is traveling. Various factors can influence the operation and accuracy of the LDW system, including the optical clarity and integrity of the camera; that is, the camera must be able to accurately detect lane markings for the LDW system to function properly. Although not an exhaustive list, some inhibiting factors that can impair the function of the camera include the optical clarity of the windshield 124, the characteristics of ambient light, the quality of the lane markings, and glare caused by light that is reflected back at or into the camera. The camera may optionally or additionally be a component of other vehicle systems that detect an environment around the vehicle, for example, detecting other vehicles, pedestrians, stop signs, snow, rain, ice, or any other environment, road, or other conditions around the vehicle. The glare shield 108 is intended to minimize glare experienced by the camera (not shown). To accomplish this, the glare shield 108 of the bracket assembly 100 is configured in consideration of the principles of light reflection, refraction, and diffusion. For purposes of this disclosure, ambient light refers to any light directed toward or into the bracket assembly 100, the camera, and/or the glare shield 108, such as, e.g., sunlight, moonlight, headlight produced by headlamps of a vehicle, brake light produced by stop lamps of a vehicle, and light generated by electrically-powered lamps, among other types of light.

Reflection will be understood by persons of skill in the art as the occurrence of light bouncing, rebounding, ricocheting, or otherwise changing direction after impact with a surface of an object. Light that is incoming or traveling toward the surface of an object can be referred to as an incident light ray, and the angle of incidence or grazing angle is the angle at which the incident light ray travels toward the surface relative to a direction normal to the surface. Specular reflection refers to a reflected light ray that has an angle of reflection equal to the angle of incidence but mirrored about the direction normal to the surface. Diffuse reflection occurs when incident light rays hit the surface of an object and reflected light rays are scattered in several directions and at varying angles relative to the incident angle. One of ordinary skill in the art will understand that diffusion is the scattering of light by diffuse reflection. Further, it will be appreciated that refraction is the bending of a light rays or waves when passing through a medium, e.g., glass or air. Refraction is typically understood as an index (n) that is equal to the speed of light (c) in a vacuum divided by the velocity of light in a medium (v). For example, air is generally accepted as having an index of refraction (n) of 1.000277, while vehicle windshields are generally manufactured to have an index of refraction (n) between about 1.5 and about 1.6.

Figure 1:
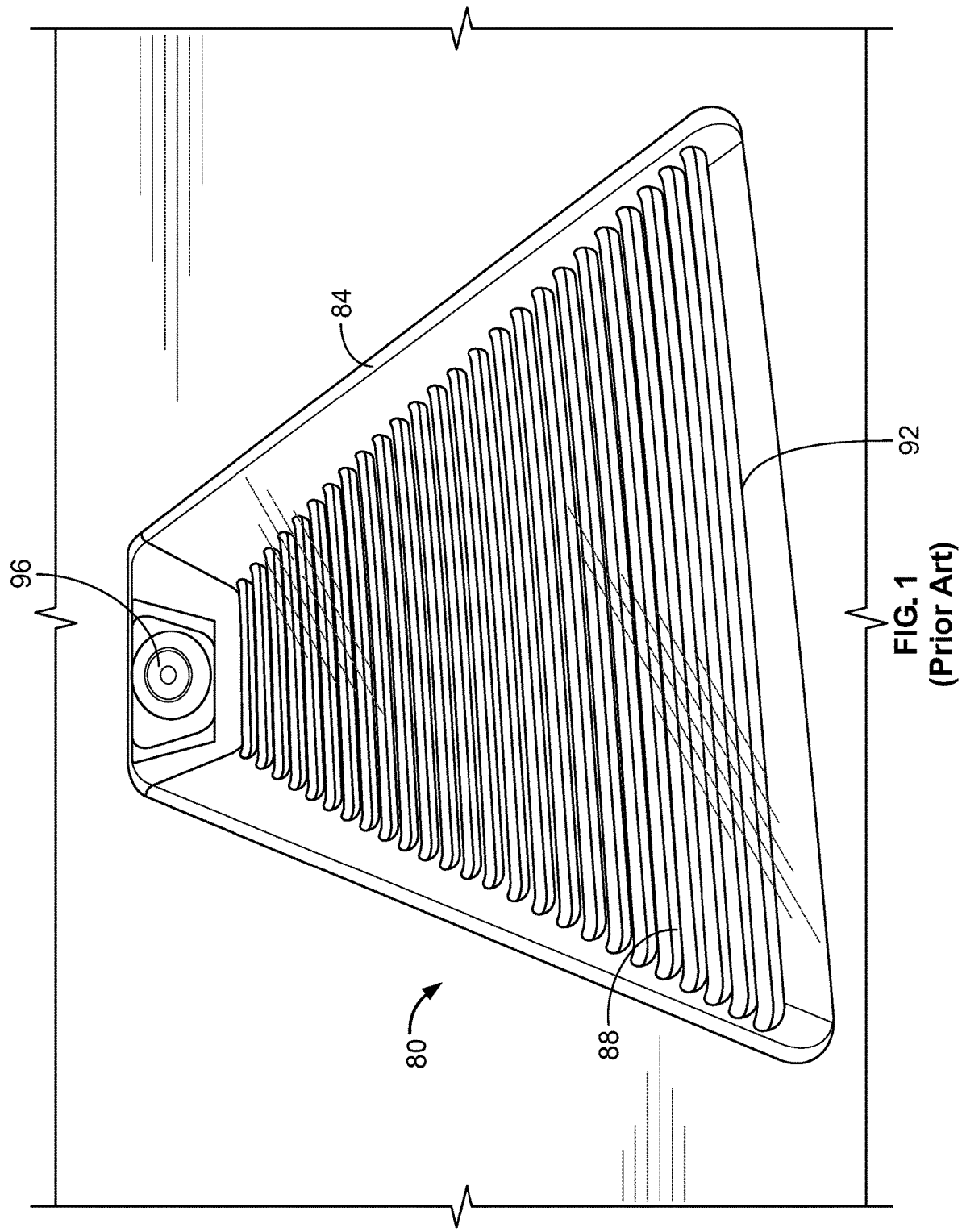
FIG. 1 is a top and left side isometric view of a prior art camera bracket assembly.

Additionally, reference to light in the present disclosure is inclusive of light across the entire visible spectrum and is not limited to light of particular wavelengths or frequencies. When light passes through the windshield 124, some light is reflected by particles, such as dirt or debris, on a surface of the windshield 124, but a majority of the light passes through the windshield 124. As a result, ambient light comes into contact with the glare shield 108 of the bracket assembly 100, where it is then reflected in various directions, i.e., diffused reflection. Some of the light is reflected back toward and through the windshield 124, and some of the light is reflected between the windshield 124 and the glare shield 108. Because light reflected from the glare shield 108 or the windshield 124 can cause the camera 96 (see FIG. 1) to experience glare, which impairs the camera's operation, an object of the present disclosure is to control the reflection of light from and within the glare shield 108 (see FIGS. 2-4) to minimize such glare. To accomplish this, the glare shield 108 can be provided with a light-absorptive surface layer of material, such as, e.g., textiles or fabrics, paint, coatings, and the like. In some examples, the glare shield 108 includes a flocked material. In other examples, the glare shield 108 includes a light absorbing coating that suppresses or captures light at various grazing angles, such as, e.g., grazing angles or angles of incidence greater than 80 degrees relative to normal. Additionally, the glare shield 108 can be constructed of a material that has light absorbing properties. Further, the glare shield 108 can be designed to have various shapes, sizes, and arrangements, such as those described herein.

It will be appreciated that the optical properties of the glare shield 108 and surfaces thereof can be evaluated according to a gloss unit (GU) that is measured by or derived from measurements taken by a glossmeter used in accordance with various testing methods, such as the "Standard Test Method for Specular Gloss" of ASTM D523-08. Other measurements and/or testing methods may be used, such as the "Standard Test Method for Visual Evaluation of Gloss Differences Between Surfaces of Similar Appearance" of ASTM D4449-15(2021). Additionally, or alternatively, reflectance of the glare shield 108 and surfaces thereof may be measured using a spectrometer and/or an integrating sphere, among other spectrophotometric instruments and techniques. For example, optical properties of the glare shield 108 may be measured in accordance with the "Standard Test Method for Determining Solar or Photopic Reflectance, Transmittance, and Absorptance of Materials Using a Large Diameter Integrating Sphere" of ASTM E1175-87 (2009). Further, it will be appreciated that various optical properties and measurements of the glare shield 108 can be used as inputs in a mathematical equation for calculating an effective optical performance value (EOPV) that allows for simplified comparison of various configurations, materials, and sizes of the glare shield 108, and other embodiments of a glare shield disclosed herein. Additionally, a modulation transfer function (MTF) may be used to quantify the amount of glare experienced by the lens of the camera when mounted with the glare shield 108. The MTF is generally understood as a measurement of image quality in a range of zero (0) to one (1), where image quality decreases as the MTF value approaches zero (0). Image quality is decreased in proportion to the amount of glare experienced by the lens of the camera and, thus, the MTF value can also be used for simplified comparison of various configurations, materials, and sizes of the glare shield 108, and other embodiments of a glare shield disclosed herein.

With reference to FIGS. 2 and 3, the bracket body 104 includes a first bracket side 128. The bracket body 104 further includes a first glare shield wall or a first sidewall 132 and a second glare shield wall or a second sidewall 136. The first sidewall 132 and the second sidewall 136 protrude outwardly from the first bracket side 128 and may be triangular in shape. The glare shield 108 may be integrally formed with the bracket body 104. For example, the bracket body 104 and the glare shield 108 can be manufactured monolithically by, e.g., an injection molding process or an additive manufacturing process. The glare shield 108 has a first end or throat end 140 and a second end or mouth end 144. In the illustrated embodiment, the glare shield 108 is disposed or formed on the bracket body 104 opposite a second bracket side 130 (see FIG. 4) that is configured to face the windshield 124 (see FIG. 5). Turning back to FIG. 2, a longitudinal axis 148 extends centrally between the first sidewall 132 and the second sidewall 136 along the glare shield 108, and the longitudinal axis 148 intersects the throat end 140 and the mouth end 144. It will be appreciated that that longitudinal axis 148 defines a longitudinal plane extending vertically therethrough and, thus, the longitudinal axis 148 will also be referenced herein as the longitudinal plane 148. In the illustrated embodiment, the glare shield 108 is symmetrical about the longitudinal plane 148, such that the first sidewall 132 and the second sidewall 136 extend outwardly relative to the longitudinal plane or axis 148 and from the throat end 140 to the mouth end 144. In particular, the first sidewall 132 and the second sidewall 136 are mirrored about the longitudinal plane 148. In the illustrated embodiment, the glare shield 108 is trapezoidal in shape, although other shapes are contemplated.

It is further contemplated that the glare shield 108 may be attached to the bracket body 104 rather than being monolithically or integrally formed with the bracket body 104. To that end, a first edge 152 of the glare shield 108 may be attached to the first sidewall 132, a second edge 156 of the glare shield 108 may be attached to the second sidewall 136, and a third edge 160 of the glare shield 108 may be attached to the first bracket side 128. The glare shield 108 may be attached, for example, by a snap attachment, fasteners, or an adhesive. In some embodiments, the glare shield 108 may be monolithically formed and, subsequently, attached to the bracket body 104. In other embodiments, the glare shield 108 is comprised of separable components that are attached and/or assembled together to form the glare shield 108, which is then attached to the bracket body 104. In still other embodiments, the glare shield 108 or components thereof can be manufactured by additive manufacturing methods or techniques, such as, e.g., printing layer-by-layer using a fused filament fabrication, a continuous fiber composite fabrication, or the like. In some embodiments, the glare shield 108 or components thereof may be manufactured using injection molding.

With reference to FIGS. 2-4, a field of view aperture or aperture 164 extends through the bracket body 104 and is formed between the first sidewall 132 and the second sidewall 136 of the glare shield 108 at the throat end 140. That is, the aperture 164 is formed between the bracket body 104 and the glare shield 108. In the illustrated embodiment, the aperture 164 extends between the first bracket side 128 and the second shield side 116 of the glare shield 108, and further extends between the first sidewall 132 and the second sidewall 136 of the glare shield 108. The bracket body 104 includes camera mounting clips 168 located on the first bracket side 128. The camera mounting clips 168 are configured to engage a camera (not shown) such that a lens 172 (see FIG. 6) of the camera (not shown) may extend through or be disposed within the aperture 164.

As shown in FIG. 4, a viewing zone 176 is formed by the glare shield 108 between the throat end 140 and the mouth end 144, and the viewing zone 176 spans across the glare shield 108 between the first sidewall 132 and the second sidewall 136. Further, a field of view angle or angle 180 of the viewing zone 176 may be defined between the first edge 152 of the glare shield 108 and the second edge 156 of the glare shield 108. That is, the field of view angle 180 spans across the first sidewall 132 and the second sidewall 136. The longitudinal plane 148 bisects the field of view angle 180 and also bisects the viewing zone 176. That is, half of the view angle 180 extends between the first sidewall 132 and the longitudinal plane 148 and another half of the viewing angle 180 is formed between the second sidewall and the longitudinal plane 148. The field of view angle 180 may be between about 45 degrees and about 135 degrees. The field of view angle 180 may alternatively be between about 45 degrees and 55 degrees. The field of view angle 180 may alternatively be between about 90 degrees and 110 degrees. The field of view angle 180 may alternatively be about 52 degrees or about 100 degrees. When the field of view angle 180 is larger or increases, the camera (not shown) has a larger field of view or viewing zone 176. Generally speaking, the field of view angle 180 is determined by a field of view of the camera. For example, if the field of view of the camera is 52 degrees, the field of view angle 180 is 52 degrees or more. It will be appreciated that when the glare shield 108 is mounted to the windshield 124 (see FIG. 5), a portion of the windshield 124 is included within the viewing zone 176.

With reference to FIGS. 2-4, one or more louvers 192 may extend across the glare shield 108 from the first edge 152 to the second edge 156 in a direction transverse and/or normal to the longitudinal plane 148. That is, the glare shield 108 comprises one or more louvers 192 that span between the first sidewall 132 and the second sidewall 136. In the illustrated embodiment, the louvers 192 are arranged in an array spaced apart from one another between the throat end 140 and the mouth end 144 in a direction parallel with the longitudinal axis 148. Each of the one or more louvers 192 includes a leading end 196 that is opposite a trailing end 200. For clarity, the leading end 196 is the end of the louver 192 disposed closer to the throat end 140 of the glare shield 108 and the trailing end 200 is the end of the louver 192 disposed closer to the mouth end 144 of the glare shield 108. In some embodiments, the louvers 192 at least partially form the first shield side 112 and the second shield side 116.

It will be appreciated that each louver 192 includes a first side or bottom side 204 (see FIG. 2) and a second side or top side 208 (see FIG. 4). The top side 208 and the bottom side 204 each define a surface area that is measured between the leading end 196 and the trailing end 200 of the louver 192 and also between first sidewall 132 and the second sidewall 136. In the illustrated embodiment, the surface area of each louver 192 varies, e.g., the surface area of each louver 192 is different relative to one another. In particular, the louver 192 closest to the mouth end 144 defines the largest surface area and the louver 192 closes to the throat end 140 defines the smallest surface area. Accordingly, the surface area of each louver 192 increases in a downstream direction, i.e., moving toward the mouth end 144 of the glare shield 108. In the illustrated embodiment, each of the louvers 192 is generally trapezoidal-shaped, and the size of each louver 192 increases in the downstream direction, such that the trapezoidal-shaped louvers 192 are larger at the mouth end 144 than at the throat end 140. In other embodiments, the louvers 192 may be differently sized and/or shaped. For example, each of the louvers 192 may be shaped to resemble a triangle, a rectangle, a rhomboid, or any other suitable polygon or irregular shape. Further, each of the louvers 192 has a thickness measured between the top side 208 and the bottom side 204. In some embodiments, each of the louvers 192 has a uniform thickness or, alternatively, each of the louvers 192 may vary in thickness relative to one another or, alternatively, each of the louvers 192 may vary in thickness between the first sidewall 132 and the second sidewall 136, between the leading end 196 and the trailing end 200, or a combination thereof.

In some embodiments, the louvers 192 may protrude outwardly from the first shield side 112 at an offset angle 212 relative to a horizontal plane 216 that is coplanar with the first bracket side 128 of the bracket body 104. In some embodiments, the louvers 192 are arranged in a downward configuration, i.e., extending downwardly away from the horizontal plane 216 of the bracket body 104, such that the trailing end 200 of each louver 192 is positioned farther from the horizontal plane 216 than leading end 196. Accordingly, when the bracket assembly 100 is mounted to the windshield 124, as in FIG. 5, each louver 192 disposed in the downward configuration has the trailing end 200 spaced farther from the windshield 124 than the leading end 196 of each louver 192. In other embodiments, the louvers 192 are configured in an upward configuration, i.e., extend upwardly toward the horizontal plane 216 of the bracket body 104, such that the trailing end 200 of each louver 192 is positioned closer to the horizontal plane than the leading end 196. Accordingly, when the bracket assembly 100 is mounted to the windshield 124, as in FIG. 5, each louver 192 disposed in the upward configuration has the leading end 196 spaced farther from the windshield 124 than the trailing end 200. Accordingly, the louvers 192 may be offset to prevent light entering through the windshield 124 from being reflected into the camera (not shown) disposed in the aperture 164. It will be appreciated that each of the louvers 192 is disposed at an offset angle 212 from the horizontal plane 216. In some embodiments, the louver 192 may be disposed in the downward configuration with the offset angle 212 being identical to a surface angle of the windshield 124, i.e., the louvers 192 are disposed parallel with the windshield 124, such that light rays traveling normal to the windshield 124 will experience minimal refraction and, after passing through the windshield 124, will have minimal reflection from the louver 192. In this way, the louvers 192 are offset to reflect light rays in a direction normal to the windshield 124, thereby minimizing glare within the viewing zone 176.

Alternatively, the louvers 192 may extend across the glare shield 108 only partially therebetween the first edge 152 and the second edge 156. The one or more louvers 192 may comprise one louver, two louvers, three louvers, or any number of louvers. Further, the louvers 192 may be spaced equidistant from one another, as measured by a length distance L, i.e., measured in a direction parallel with the longitudinal axis 148, between the trailing ends 200 and the leading ends 196 of adjacent louvers 192, and between the throat end 140 and the mouth end 144 down the first shield side 112 of the glare shield 108. In other embodiments, the louvers 192 are spaced apart from one another varying distances along or down the first shield side 112 and spaced apart varying length distances L along or down the second shield side 116, such that the spacing, i.e., distance L, between or among louvers 192 differs between the first shield side 112 and the second shield side 116. In some embodiments, the louvers 192 may be convexly or concavely curved between the first sidewall 132 and the second sidewall 136 relative to the horizontal plane 216. Accordingly, when the bracket 100 is mounted to the windshield 124, the louvers 192 of the glare shield 108 may be bow convexly toward the windshield 124 or the louvers may bow concavely away from the windshield 124. The louvers 192 may be integrally formed in the glare shield 108, for example by a molding process or by additive manufacturing. In some embodiments, the louvers 192 and the glare shield 108 may be made of a polymer material, such as, e.g., or a thermoplastic material, or a composite material, among others.

As illustrated in FIGS. 2-4, slits 220 are formed in an array in the glare shield 108 by or between the louvers 192. That is, the slits 220 are defined between adjacent louvers 192 and, more specifically, between the leading end 196 of one of the louvers 192 and the trailing end 200 of another louver 192. Accordingly, the slits 220 are arranged in an array along the glare shield 108 between the throat end 140 and the mouth end 144. In some embodiments, the slits 220 are provided of varying sizes along the glare shield 108. Because the slits 220 are formed between the louvers 192, the length distance L represents a longitudinal dimension of the slits 220. Further, that slits 220 may have varying width distances W, i.e., measured in a transverse direction normal to the longitudinal axis 148, between the first sidewall 132 and the second sidewall 136. That is, the slits 220 may vary in size, e.g., length L and/or width W, relative to one another. In some embodiments, the slits 220 extend continuously between the first sidewall 132 and the second sidewall 136. In other embodiments, the slits 220 are interrupted or discontinuous between the first sidewall 132 and the second sidewall 136.

The slits 220 are configured to allow air and light to pass through the glare shield 108. The addition of one or more louvers 192 formed in the glare shield 108 may reduce reflection of light off of the glare shield 108. For example, light that is transmitted through the windshield 124 may pass through the slits 220 of the glare shield 108 where it may be absorbed or redirected elsewhere in the bracket body 104 or housing 120. Further, depending on the configuration of the louvers 192, light may be reflected off of one of the louvers 192 and into one of the slits 220, such that the light is captured between the louvers 192 and within the slits 220. In this way, the glare shield 108 is configured to reduce the amount of glare experienced by the lens of the camera when in use. Accordingly, the glare shield 108 is configured to provide improved suppression of reflected light interfering with the camera and, thus, to reduce gloss units (GU) measured as described above in comparison with conventional glare shields, such as the glare shield 84. Similarly, the glare shield 108 is configured to have higher optical performance, e.g., EOPV, when compared to conventional glare shields, such as the glare shield 84. Further, the glare shield 108 is configured to provide improved image quality and, thus, to provide an increased MTF value, when compared with conventional glare shields, such as the glare shield 84. Additionally, due to the slits 220 and louvers 192, the glare shield 108 may allow for increased circulation of air within and in and out of the viewing zone 176, which can be advantageous for promoting defrosting of the windshield 124 or for preventing moisture, e.g., condensation, from forming on the camera (not shown) or the glare shield 108.

In some embodiments, as shown in FIG. 3, the bracket assembly 100 includes a heater strip 224 having a heater element 228. In some embodiments, the heater strip 224 is provided in the form of a flexible heat tape or cable that can be attached to the glare shield 108. The heater strip 224 can include a coating or substrate material that is capable of electrically insulating the heater element 228 from direct exposure to moisture. The heater element 228 and/or the heater strip 224 can be provided in the form of a single, continuous filament or, alternatively, as multiple segments or sections of different filaments or elements. The heater element 228 may be applied in a curvilinear path between the throat end 140 and the mouth end 144 of the glare shield 108 and between the first sidewall 132 and the second sidewall 136. Accordingly, the heater strip 224 extends between the throat end 140 and the mouth end 144 of the glare shield 108, and between the first sidewall 132 and the second sidewall 136. In some embodiments, the heater strip 224 may be disposed on the first bracket side 128. The heater strip 224 may be linearly applied on the first bracket side 128 around the first edge 152, the second edge 156, and the third edge 160 of the glare shield 108 on the bracket body 104. The heater strip 224 can be wound about the one or more louvers 192 of the glare shield 108, such that the heater strip 224 extends into, through, or across one or more of the slits 220. In some embodiments, the heater strip 224 is embedded within the glare shield 108, such as, e.g., between layers of material forming the one or more louvers 192.

In some embodiments, the heater strip 224 is disposed on the first shield side 112 of the glare shield 108 and extends along the glare shield 108 between the throat end 140 and the mouth end 144. The heater strip 224 may be linearly or curvilinearly applied along the first edge 152, the second edge 156, and the third edge 160 of the glare shield 108 on the first shield side 112 of the glare shield 108. In some embodiments, the heater strip 224 is applied on the first shield side 112 of the glare shield 108 to extend across at least one louver 192. In the illustrated embodiment, the heater strip 224 is applied in a curvilinear path to snake along the louvers 192. The heater strip 224 can be otherwise applied, such as, e.g., in discrete, linear segments or meshes of patterns across the louvers 192. The heater strip 224 may heat air surrounding the glare shield 108 and within the housing 120 to cause convection of the air, e.g., circulation, through the slits 220 formed in the glare shield 108. In this way, the heater strip 224 promotes convection heating that can quickly or rapidly defrost the windshield 124 and/or the lens 172 of the camera (not shown), thereby effectively clearing the viewing zone 176. It will be appreciated that because air can pass through the slits 220 between the louvers 192, the glare shield 108 and the heater strip 224 are configured to allow for improved heated air circulation, which results in reduced defrosting times, when compared to conventional glare shields, such as the glare shield 84. As such, the viewing zone 176, including portions of the windshield 124 exposed to the camera, are cleared by operation of the heater strip 224, such that the viewing zone 176 may be cleared of interferences, e.g., moisture.

Alternatively, as shown in FIG. 4, the heater strip 224 may be disposed on the second bracket side 130. The heater strip 224 may be linearly or curvilinearly applied around the first edge 152, the second edge 156, and the third edge 160 of the glare shield 108 on the second shield side 116 of the glare shield 108. Alternatively, the heater strip 224 may be only partially disposed on the second shield side 116 of the glare shield 108. In some embodiments, the heater strip 224 may be applied on the second shield side 116 of the glare shield 108 across at least one louver 192 in any of the configurations described above. For example, the heater strip 224 may be applied in a curvilinear path to snake along the louvers 192 on the second shield side 116. The heater strip 224 can be otherwise applied, for example, linearly across the louvers 192 on the second shield side 116.

As noted above, the heater strip 224 may heat air to cause convection or circulation of air through the slits 220 formed in the glare shield 108 and may thereby defrost the windshield 124 and/or the lens 172 of the camera (not shown). To that end, the heater strip 224 increases the temperature of the surrounding air within the viewing zone 176 of the glare shield 108. In turn, a temperature differential is created between the heated air and colder air occupying the space within the housing 120, near the lens 172 of the camera 96, and along the windshield 124. Due to the temperature differential, colder air sinks while the heated air rises, which provides movement or circulation of air within the viewing zone 176 of the glare shield 108. Due to the lens 172 being positioned at the throat end 140 of the glare shield 108 and the louvers 192 extending between the throat end 140 and the mouth end 144, the lens 172 is disposed at a higher elevation than the louvers 192. Thus, the heated air passing through the slits 220 and within the viewing zone 176 will generally travel toward the lens 172. In this way, the lens 172 and the air surrounding the lens 172 is heated to be cleared from moisture, such as films of condensation that can form on the lens 172. The viewing zone 176 may be understood as being entirely or 100% cleared when there are no interferences present to obstruct the camera's view. Accordingly, the heater 224 operates to clear the viewing zone 176 entirely, i.e., 100% cleared, of interferences within a run time RT of between about 3 minutes and about 15 minutes and, preferably, between about 5 minutes and about 12 minutes. In one embodiment, the heater 224 is configured to clear the viewing zone 176 to 100% cleared in a run time RT of about 7 minutes. It will be appreciated that the run time RT of the heater 224 is also dependent upon the thickness of the portions of the windshield 124 within the viewing zone 176, the ambient temperature outside of the vehicle and, thus the temperature of the portions of the windshield 124 in the viewing zone 176, the acceptable rate at which the heater 224 may increase the temperature of the portions of the windshield 124 in the viewing zone 176, among other factors.

As mentioned previously, the heater strip 224 can include insulation, such as, e.g., polymer materials, thermoset or thermoplastic materials, glass, porcelain, composite materials, or the like. The heater element 228 can be a variety of types, such as, e.g., a positive temperature coefficient ink printed onto the insulator, such as those disclosed in U.S. Pat. Nos. 4,857,711 and 4,931,627, both of which are assigned to Illinois Tool Works, Inc. and hereby incorporated in their entirety by reference. The heater strip 224 can be provided to be self-regulating, such that the heater element 228 provides greater resistance and thereby reduces heating with increased temperatures and increases heating with decreased or lower temperatures. Further, it is contemplated that the heater strip 224 is in communication with inputs, such as, e.g., humidity sensors, rain sensors, temperature sensors, and the like, which at least partially or fully control the heating operation of the heater strip 224. The heater strip 224 may be configured to operate at a constant temperature for variable periods of time, or to modulate heating temperatures based upon one or more inputs. In some embodiments, the heater strip 224 is configured to draw between about 0.5 amps and about 5 amps. In some embodiments, the heater strip 224 is configured to draw between about 1 amp and about 4 amps. In one embodiment, the heater strip 224 is configured to draw between about 1.5 amps and about 3 amps.

With reference to FIGS. 2-4, the bracket body 104 may include one or more beauty cover mounts or cover mounts 232 that extend out from the first bracket side 128. The beauty cover mounts 232 may be configured to engage a beauty cover or housing 120 as shown in FIG. 4. Further, the bracket body 104 may include one or more sensor areas. For example, the bracket body 104 may include a first sensor area 236 configured to engage a humidity sensor (not shown). The bracket body 104 may alternatively or additionally include a second sensor area 240 configured to engage a rain sensor (not shown). As shown in FIG. 5, the housing 120 may completely cover the first bracket side 128 and any components attached thereon.

With reference to FIG. 4, the bracket body 104 may comprise adhesive 244 on the second shield side 116. The adhesive 244 may be a polyurethane bead adhesive, although other configurations are possible. The bracket body 104 may be adhesively attached to the windshield 124 (see FIG. 5) of a vehicle with the adhesive 244. In some embodiments, the heater strip 224 may be disposed on the windshield 124 in a curvilinear path similar to the configurations as shown in FIGS. 3 and 4. In other embodiments, the heater strip 224 may be linearly applied on the windshield 124 and spaced apart from the first edge 152, the second edge 156, and the third edge 160 of the glare shield 108. The heater strip 224 can be otherwise applied on the windshield 124, for example, the heater strip 224 may be applied in a curvilinear path across a portion of the windshield 124 that is adjacent to the viewing zone 176, rather than being applied to snake along the louvers 192. In this way, the heater strip 224 can directly heat the windshield 124 and also can heat air that circulates into the viewing zone 176 through the slits 220 formed in the glare shield 108 and may thereby defrost the windshield 124 and/or the lens 172 of the camera (not shown).

Figure 6:
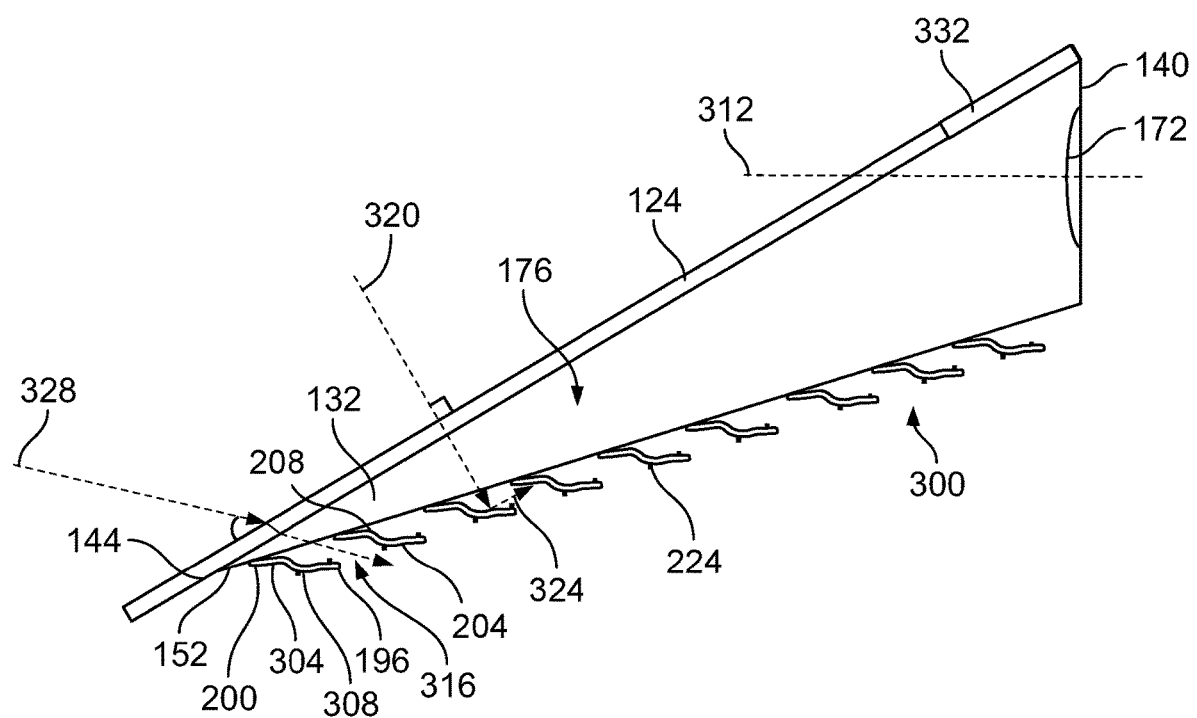
FIG. 6 illustrates a schematic representation of a sectional view of another embodiment of a glare shield.

FIG. 6 illustrates a schematic representation of a sectional view of another embodiment of a glare shield 300 that has a plurality of louvers 304 arranged in an array. Because the glare shield 300 has similarities to the glare shield 108 of FIGS. 2-4, like reference numerals will be used to indicate like elements. The plurality of louvers 304 are spaced apart from one another in a stepped array between the throat end 140 and the mouth end 144 of the glare shield 300. Further, the heater strip 224 is applied to the plurality of louvers 304 of the glare shield 300. In the illustrated embodiment, the heater strip 224 is applied to both the top side 208 and the bottom side 204 of each of the louvers 304. In particular, the heater strip 224 is applied to the top side 208 of each of the louvers 304 and located closer to the leading end 196 than to the trailing end 200, and the heater strip 224 is applied to the bottom side 204 of each of the louvers 304 and located approximately centrally between the leading end 196 and the trailing end 200 at a midpoint 308. In other embodiments, the heater strip 224 may only be applied on the top side 208 or the bottom side 204 of each of the louvers 304, or the heater strip 224 may be applied to less than all of the louvers 304, or the heater strip 224 may be positioned anywhere on the top side 208 or the bottom side 204.

In the illustrated embodiment, each of the louvers 304 has a curved profile or elongated "S" shape between the leading end 196 and the trailing end 200. Accordingly, each of the louvers 304 curves convexly between the trailing end 200 and the midpoint 308 relative to a viewing axis 312 extending centrally through the lens 172. It will be appreciated that the viewing axis 312 extends in parallel with the longitudinal axis 148 and is intersected by the longitudinal plane thereof. Also, the viewing axis 312 extends in parallel with the horizontal plane 216 of the bracket body 104 (see FIG. 3). Each of the louvers 304 curves concavely between the midpoint 308 and the leading end 196 relative to the viewing axis 312. Looking at one single louver 304, the leading end 196 is spaced farther from the viewing axis 312 than the trailing end 200. In addition, the leading end 196 of each louver 304 is obscured from view of the lens 172 by an adjacent, upstream louver 304, where upstream is defined as a position closer to the lens 172. As such, only the trailing end 200 of each louver 304 is visible or unobscured in relation to the lens 172.

With reference to FIG. 6, slits 316 are formed between the louvers 304 and, thus, the slits 316 follow the curvature of the louvers 304 between the leading end 196 and the trailing end 200. For reference purposes, an incident light ray 320 is depicted as passing the windshield 124 and normal to the windshield 124. The incident light ray 320 is depicted as impacting one of the louvers 304 and a diffuse light ray 324 bounces or reflects from the louver 304 toward the adjacent, upstream louver 304. As a result, the diffuse light ray 324 passes into the slit 316 formed between the two adjacent louvers 304 and, therefore, becomes capture or trapped by the glare shield 300. Accordingly, the diffuse light ray 324 is prevented from reflecting into the lens 172. Additionally, a stray light ray 328 is illustrated as being refracted through the windshield 124 and through the slit 316, without contacting the louvers 304. In this way, the light transmitted and refracted through the windshield 124 is guided away from the viewing zone 176 and, also, away from contacting or interfering with the lens 172. Accordingly, the glare shield 300 is configured to provide improved suppression of reflected light interfering with the camera and, thus, to reduce gloss units (GU) measured as described above in comparison with conventional glare shields, such as the glare shield 84. Similarly, the glare shield 300 is configured to have higher optical performance, e.g., EOPV, when compared to conventional glare shields, such as the glare shield 84. Further, the glare shield 300 is configured to provide improved image quality and, thus, to provide an increased MTF value, when compared with conventional glare shields, such as the glare shield 84. Further, the windshield 124 includes a barrier portion 332 located adjacent the throat end 140 of the glare shield 300 and comprised of an opaque coating or material that prevents direct sunlight from hitting the lens 172.

Figure 7:
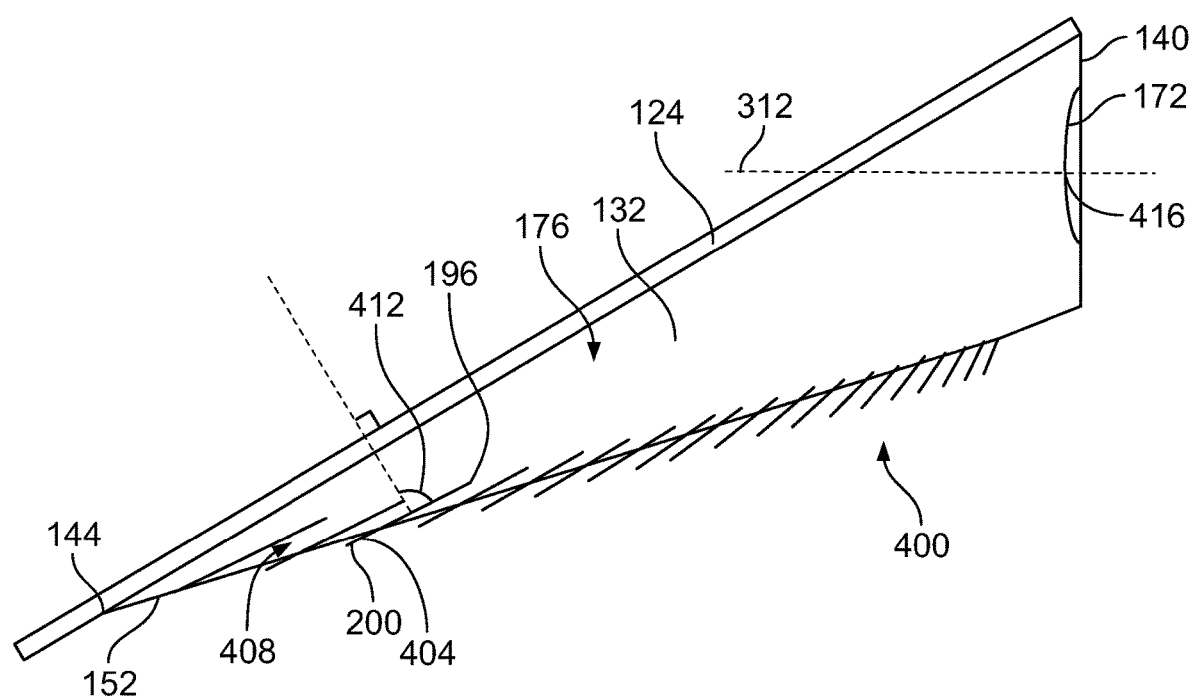
FIG. 7 illustrates a schematic representation of a sectional view of another embodiment of a glare shield.
Figure 8:
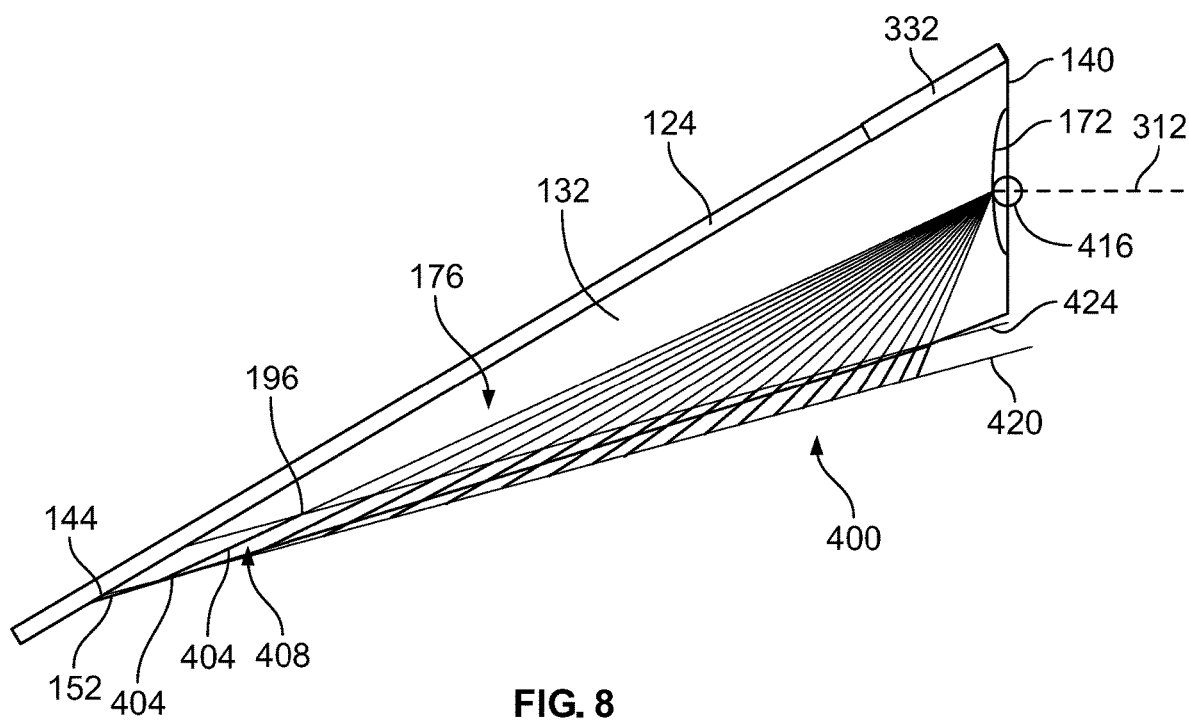
FIG. 8 illustrates a schematic representation of the glare shield of FIG. 7.

FIGS. 7 and 8 illustrate another schematic representation of a sectional view of another embodiment of a glare shield 400 that has a plurality of louvers 404 arranged in an array. Because the glare shield 400 has similarities to the glare shield 108 of FIGS. 2-4 and the glare shield 300 of FIG. 6, like reference numerals will be used to indicate like elements. The plurality of louvers 404 are spaced apart from one another in an offset array between the throat end 140 and the mouth end 144, and slits 408 are formed between the louvers 404. It will be appreciated that the heater strip 224 may be applied to the glare shield 400 in a similar fashion to the glare shield 108 and the glare shield 300. Each of the louvers 404 extends at a different offset angle 412 relative to a direction normal to the windshield 124 and, also, relative to the viewing axis 312 passing through the lens 172. In the illustrated embodiment, the louvers 404 are oriented at an offset angle that is coaxial with a focal point 416 of the lens 172, as indicated in FIG. 8. That is, each of the louvers 404 is oriented at an offset angle 412 that varies as a function of its position relative to the lens 172, where louvers 404 positioned farther from the lens 172 have lower offset angles 412 and louvers 404 positioned closer to the lens 172 having higher offset angles 412. Accordingly, the louvers 404 are offset from the viewing axis 312 as a function of a distance from the lens 172.

In the illustrated embodiment, the leading end 196 of each louver 404 is positioned closer to the viewing axis 312 than the trailing end 200 As illustrated in FIG. 8, a first side or bottom side plane 420 extends tangentially across the trailing ends 200 of the louvers 404 and a second side or top side plane 424 extends tangentially across the leading end 196 of the louvers 404. In the illustrated embodiment, the top side plane 424 and the bottom side plane 420 are substantially parallel with one another. Accordingly, the glare shield 400 is configured to provide improved suppression of reflected light interfering with the camera and, thus, to reduce gloss units (GU) measured as described above in comparison with conventional glare shields, such as the glare shield 84. Similarly, the glare shield 400 is configured to have higher optical performance, e.g., EOPV, when compared to conventional glare shields, such as the glare shield 84. Further, the glare shield 400 is configured to provide improved image quality and, thus, to provide an increased MTF value, when compared with conventional glare shields, such as the glare shield 84.

Figure 9A:
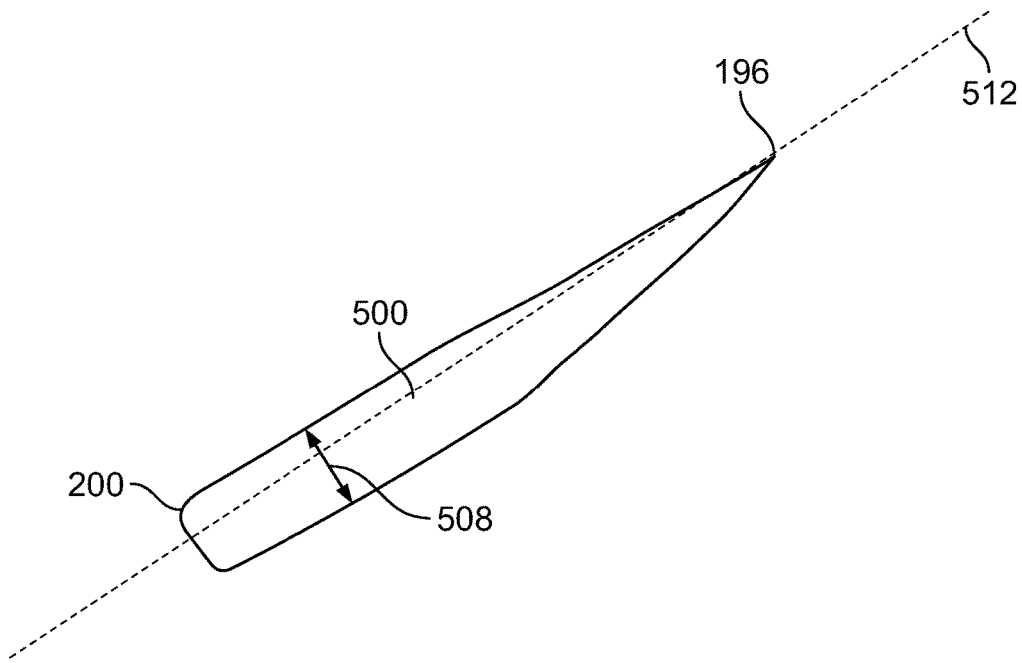
FIGS. 9A and 9B are schematic representations of side views of louvers, according to another embodiment of the present disclosure.
Figure 9B:
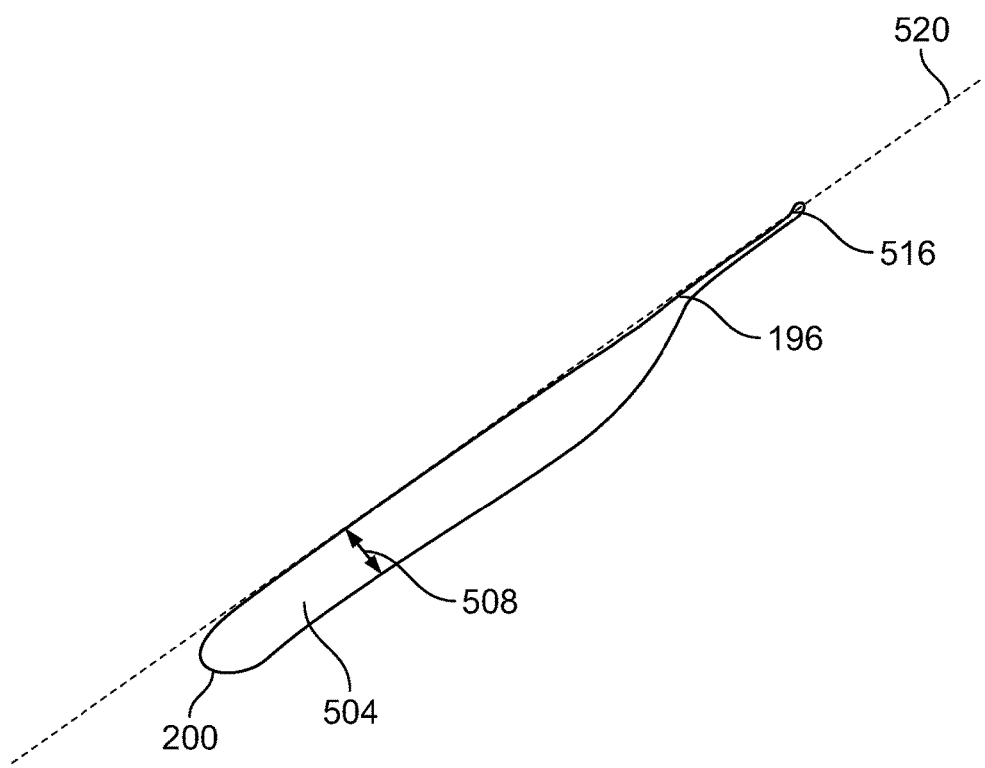

FIGS. 9A and 9B depict schematic representations of side views of alternative embodiments of louvers 500, 504 that taper or narrow between the leading end 196 and the trailing end 200. In FIG. 9A, the louver 500 narrows or reduces gradually in thickness 508 moving in a direction from the trailing end 200 to the leading end 196. A reference axis 512 extends centrally through the leading end 196 and the trailing end 200 of the louver 500, such that the louver 500 is substantially symmetrical about the reference axis 512. In FIG. 9B, the louver 504 has a thin extension or nose 516 protruding from the leading end 196. A reference axis 520 extends centrally through the leading end 196 and the nose 516 and also extends tangentially along the top side 208 of the louver 504, such that the louver 504 is asymmetrical about the reference axis. The nose 516 has a uniform thickness, while the louver 504 increases in thickness 508 from the leading end 196 to the trailing end 200.

Figure 10:
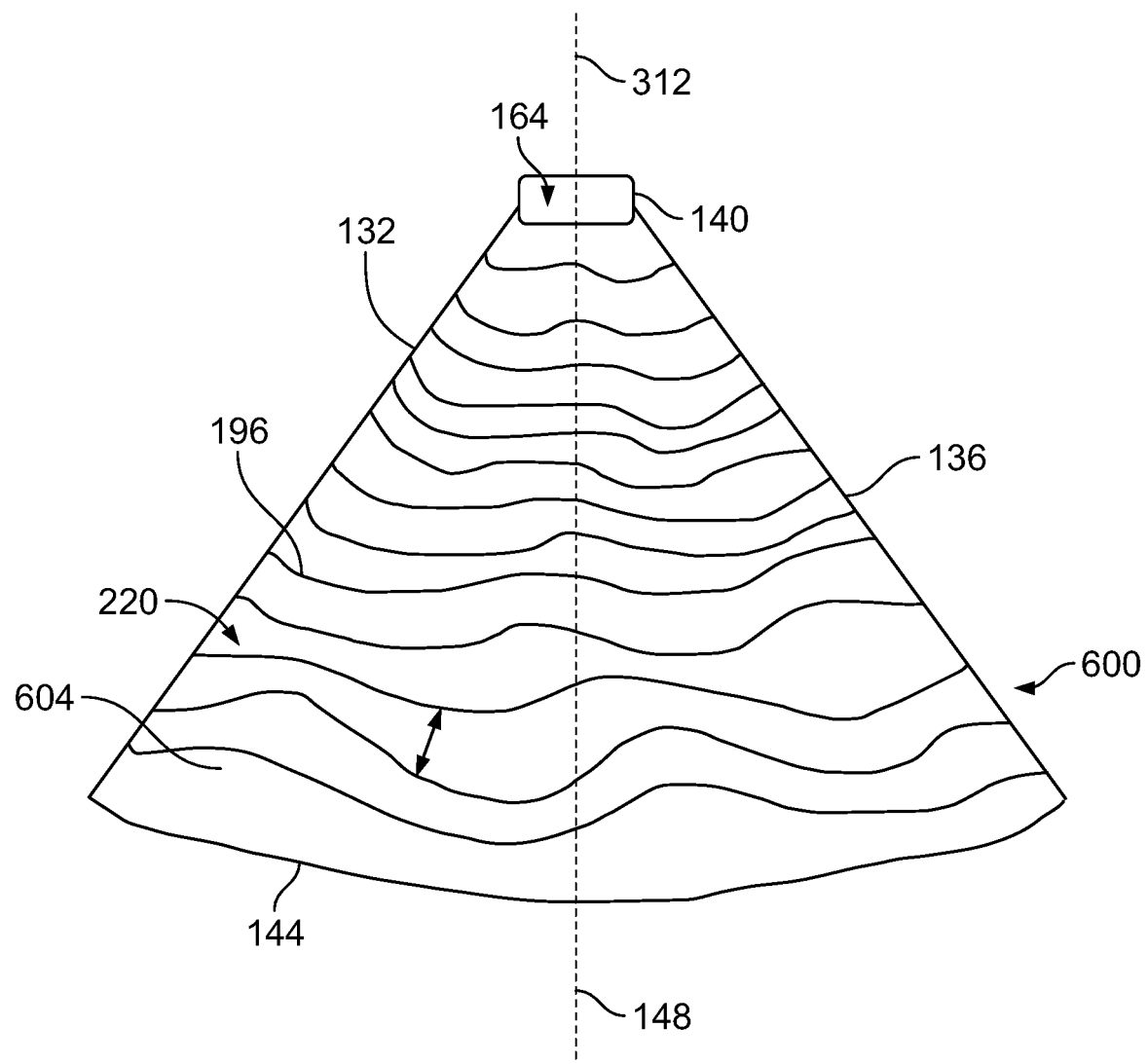
FIG. 10 is a schematic representation of a top plan view of still another embodiment of a glare shield.

FIG. 10 depicts a schematic representation of a top plan view of another embodiment of a glare shield 600. Because the glare shield 600 has similarities to the glare shield 108 of FIGS. 2-4, like reference numerals will be used to indicate like elements. The glare shield 600 has a plurality of louvers 604 spaced in an array between the throat end 140 and the mouth end 144 in the longitudinal direction parallel with the viewing axis 312. As illustrated, the longitudinal plane 148 intersects and is coaxial with the viewing axis 312. The leading end 196 of each of the plurality of louvers 604 is curved between the first sidewall 132 and the second sidewall 136. In the illustrated embodiment, the leading end 196 curves convexly toward the throat end 140 and also concavely away from the throat end 140. Further, the curvature of the leading end 196 varies among the plurality of louvers 604, such that each louver 604 varies in size and shape relative to one another. Additionally, the plurality of louvers 604 of the glare shield 600 are asymmetrical about the longitudinal plane 148 and/or the viewing axis 312. In the illustrated embodiments, the louvers 604 extend continuously between the first sidewall 132 and the second sidewall 136 of the glare shield 108. In other embodiments, one or more of the louvers 604 may be interrupted by a void (not shown) between the first sidewall 132 and the second sidewall 136. Accordingly, the glare shield 600 is configured to provide improved suppression of reflected light interfering with the camera and, thus, to reduce gloss units (GU) measured as described above in comparison with conventional glare shields, such as the glare shield 84. Similarly, the glare shield 600 is configured to have higher optical performance, e.g., EOPV, when compared to conventional glare shields, such as the glare shield 84. Further, the glare shield 600 is configured to provide improved image quality and, thus, to provide an increased MTF value, when compared with conventional glare shields, such as the glare shield 84.

The entire disclosure of each patent and publication cited herein is incorporated by reference, as if each such patent or publication were individually incorporated by reference herein.

INDUSTRIAL APPLICABILITY

Numerous modifications to the present invention will be apparent to those skilled in the art of bracket assemblies in view of the foregoing description. Accordingly, this description is to be construed as illustrative only and is presented for the purpose of enabling those skilled in the art to make and use the invention. The exclusive rights to all modifications which come within the scope of the appended claims are reserved.

We claim:

1. A bracket assembly for mounting a camera to a vehicle, the bracket assembly comprising:
   a bracket body; and
   a glare shield that extends along the bracket body, wherein a longitudinal axis is centrally disposed between a first sidewall and a second sidewall of the glare shield,
   wherein the first sidewall and the second sidewall of the glare shield extends between a throat end and a mouth end, the throat end defining an aperture,
   wherein at least one slit extends through the glare shield and spans between the first sidewall and the second sidewall, the at least one slit defined by a plurality of louvers,
   wherein the plurality of louvers includes a leading end and a trailing end opposite of the leading end, the leading end disposed closer to the throat end of the glare shield,
   wherein the plurality of louvers is defined by a curved profile, the curved profile including a convex portion and a concave potion, and
   wherein a thickness of the plurality of louvers is reduced moving in a direction from a trailing end to the leading end.

2. The bracket assembly of claim 1, wherein the plurality of louvers are spaced apart from one another in a direction that is parallel with the longitudinal axis.

3. The bracket assembly of claim 1, wherein the at least one slit spans continuously across the glare shield in a transverse direction that is normal to the longitudinal axis.

4. The bracket assembly of claim 1, wherein the at least one slit includes a plurality of slits that are spaced apart from one another in a direction that is parallel with the longitudinal axis.

5. The bracket assembly of claim 4, wherein each slit of the plurality of slits has a length dimension in a direction parallel with the longitudinal axis and the length dimension varies among the plurality of slits.

6. The bracket assembly of claim 4, wherein each slit of the plurality of slits has a width dimension in a direction normal to the longitudinal axis and the width dimension varies among the plurality of slits.

7. The bracket assembly of claim 1, wherein the leading end includes a nose protruding from the leading end, the nose extending tangentially along a top side of the plurality of louvers.

8. A bracket assembly for mounting a camera to a vehicle, the bracket assembly comprising:
   a bracket body; and
   a glare shield that extends along the bracket body, wherein a longitudinal axis is centrally disposed between a first sidewall and a second sidewall of the glare shield,
   wherein a plurality of louvers span between the first sidewall and the second sidewall,
   wherein the plurality of louvers is disposed at an offset angle relative to a horizontal plane defined by the bracket body, and
   wherein the at least one of the plurality of louvers extends at a different offset angle.

9. The bracket assembly of claim 8, wherein the at least one louver is disposed in a downward configuration.

10. The bracket assembly of claim 8, wherein the at least one louver is disposed in an upward configuration.

11. The bracket assembly of claim 8, wherein the at least one louver includes a plurality of louvers that extend in an array from a first end to a second end of the glare shield.

12. The bracket assembly of claim 11, wherein the louvers are spaced equidistant from one another.

13. The bracket assembly of claim 11, wherein the louvers have a leading end that is curved between the first sidewall and the second sidewall.

14. The bracket assembly of claim 8, wherein the offset angles of each of the plurality of louvers are different.

15. A bracket assembly for mounting a camera to a vehicle, the bracket assembly comprising:
   a bracket body;
   a glare shield that extends along the bracket body, wherein a longitudinal axis is centrally disposed between a first sidewall and a second sidewall of the glare shield, wherein at least one louver spans between the first sidewall and the second sidewall, the at least one louver at least partially defining at least one slit; and
   a heater strip, wherein the heater strip is applied to both a top side and a bottom side of the at least one louver of the glare shield.

16. The bracket assembly of claim 15, wherein the heater strip extends between the first sidewall and the second sidewall of the glare shield in a curvilinear path.

17. The bracket assembly of claim 15, wherein the heater strip is configured to be operated to clear a viewing zone formed by the glare shield.

18. The bracket assembly of claim 15, wherein the heater strip is applied directly to the at least one louver of the glare shield in a curvilinear path.

* * * * *